US005555384A

United States Patent [19]
Roberts et al.

[11] Patent Number: 5,555,384
[45] Date of Patent: Sep. 10, 1996

[54] RESCHEDULING CONFLICTING ISSUED INSTRUCTIONS BY DELAYING ONE CONFLICTING INSTRUCTION INTO THE SAME PIPELINE STAGE AS A THIRD NON-CONFLICTING INSTRUCTION

[75] Inventors: David B. Roberts, Santa Clara; George S. Taylor, Menlo Park; David M. Parry, Santa Clara, all of Calif.

[73] Assignee: Silicon Graphics, Inc., Mountain View, Calif.

[21] Appl. No.: 324,861

[22] Filed: Oct. 18, 1994

Related U.S. Application Data

[63] Continuation of Ser. No. 35,544, Mar. 23, 1993, abandoned, which is a continuation of Ser. No. 444,495, Dec. 1, 1989, abandoned.

[51] Int. Cl.⁶ ............................................. G06F 9/38
[52] U.S. Cl. ............................................. 395/375
[58] Field of Search ............................. 395/375, 800

[56] References Cited

U.S. PATENT DOCUMENTS

| | | | |
|---|---|---|---|
| 4,594,660 | 6/1986 | Guenthner et al. | 395/250 |
| 4,750,154 | 6/1988 | Lefsky et al. | 395/375 |
| 4,760,519 | 7/1988 | Papworth et al. | 395/375 |
| 4,789,925 | 12/1988 | Lahti | 395/800 |
| 4,814,976 | 3/1989 | Hansen et al. | 395/375 |
| 4,858,176 | 8/1989 | Wilhite et al. | 395/375 |
| 4,891,753 | 1/1990 | Budde et al. | 395/375 |
| 4,903,196 | 2/1990 | Pomerene et al. | 395/375 |
| 5,019,967 | 5/1991 | Wheeler et al. | 395/725 |
| 5,073,855 | 12/1991 | Staplin et al. | 395/375 |
| 5,075,844 | 12/1991 | Jardine et al. | 395/375 |
| 5,127,093 | 6/1992 | Moore, Jr. | 395/375 |
| 5,133,077 | 7/1992 | Karne et al. | 395/800 |
| 5,226,126 | 7/1993 | McFarland et al. | 395/375 |

OTHER PUBLICATIONS

Acosta et al., "An Instruction Issuing Approach to Enhancing Performance in Multiple Functional Unit Processors," IEEE Transactions on Computers, vol. C-35, No. 9, Sep. 1986.

Keller, Robert M., "Look-Ahead Processors," Computing Surveys, vol. 7, No. 4, Dec. 1975.

Intel, "iAPX 86/88, 186/188 User's Manual, Hardware Reference," 1985, pp. 1-11 to 1-12.

*Primary Examiner*—Richard L. Ellis
*Attorney, Agent, or Firm*—Sterne, Kessler, Goldstein & Fox P.L.L.C.

[57] ABSTRACT

Methods and apparatus for optimizing the operation of an instruction pipeline in a computer are disclosed. The methods and apparatus function at both the effective beginning and end of the pipeline. At the pipeline's beginning, a Pipeline Controller monitors the availability of data for various floating point operations. Data is read at either a fast or slow rate, depending on its availability, and instructions are allowed to proceed through the pipeline based on this data availability. At the effective end of the pipeline, the Controller monitors all instructions in the pipeline, notes all potential resource conflicts, and resolves these potential conflicts by either the insertion of an appropriate number of HOLD states or the conclusion that no actual resource competition exists.

19 Claims, 7 Drawing Sheets

RESCHEDULING CONFLICTING ISSUED INSTRUCTIONS BY DELAYING ONE CONFLICTING INSTRUCTION INTO THE SAME PIPELINE STAGE AS A THIRD NON-CONFLICTING INSTRUCTION

This is a Continuation of application Ser. No. 08/035,544, filed Mar. 23, 193, now abandoned which is a continuation of application Ser. No. 07/444,495, now abandoned, filed Dec. 20, 1995.

FIELD OF THE INVENTION

This invention relates to digital computers. More precisely, it relates to floating point arithmetic coprocessors used in conjunction with a Reduced Instruction Set Computer ("RISC") microprocessor.

BACKGROUND OF THE INVENTION

Although computers using RISC architecture are relatively new, their design philosophy and construction are already well known. For a discussion of the general background of RISC, see *MIPS R2000 RISC Architecture,* G. Kane, 1987, Prentice Hall, N.J.

One RISC design goal is to achieve an average instruction execution rate of one instruction per clock cycle. One way to reduce the average number of cycles required to execute an instruction without increasing the length of the clock cycle is to overlap the execution of multiple instructions. This overlapping of instructions is called "pipelining". Instruction pipelines work by dividing the execution of each instruction into several discrete portions and then executing one portion of several different instructions simultaneously. For example, the execution of an instruction might be subdivided into four portions as shown in FIG. 1.

As shown, each instruction is divided into four stages, labelled F, A, M, and W, and four clock cycles are required to execute each instruction. In this example, the mnemonic purposes of the chosen initials are unimportant and are consequently not discussed. By creating an instruction pipeline, a certain amount of operational parallelism is achieved. Parallelism here describes the fact that four instructions are being executed simultaneously. Although each instruction still requires four clock cycles to execute, if a four-level instruction pipeline is created, a new instruction can be initiated at each clock cycle. When there is an instruction executing in each stage of the pipeline, the pipeline is said to be full. Once the pipeline is full, the effective rate of instruction completion is one instruction per clock cycle. Notice in FIG. 1 that after clock cycle three, when the pipeline becomes filled, each successive clock cycle denotes the completion of one instruction. By breaking down each instruction into four smaller and simpler parts, the individual parts can be executed faster, allowing the clock cycles to be shortened. As the issue rate for new instructions depends upon the clock cycle, a shorter clock cycle leads to a higher instruction issue rate. To maintain this rate requires that the pipeline be kept full and that nothing delay the advance of instructions through the pipeline.

Problems develop in pipelined computers when the number of cycles required to complete each instruction is not identical. Different instruction latencies (the time required to perform an instruction) result in competition for the same computer resources (memory, buses, etc.) and effectively stall the pipeline. Indeed, variations in instruction latency can negate the advantages of an instruction pipeline.

These effects are particularly severe when floating point arithmetic operations are performed. Depending upon both the type of operation and on the size of the operands, the time required to execute a floating point arithmetic operation ranges from one to nineteen clock cycles in a typical computer. These differing operational latencies result in competition for the pipeline's resources, which causes the pipeline to stall, and results in fewer than one instruction per cycle being completed. Stall is used herein to describe the condition of the pipeline when a given instruction cannot be completely executed within its standard latency. Consequently other instructions must be held up or "stalled" until the given instruction clears the pipeline.

In addition to resource competition, stalls can be caused by a phenomenon known as data dependency. Frequently, successful execution of the current instruction requires results generated by a previous instruction. For example, if two Add instructions are executed consecutively and the second Add uses the result of the previous Add as one of its operands, the second Add cannot be executed until the result of the previous operation is available. Any condition which delays the execution of the first instruction will therefore delay the next and successive instructions. In the example given, the operands for the second Add are needed in an early stage of the pipeline. As the result of the first Add is not usually available until a later stage of the pipeline, the second Add must usually be stalled until the result of the first Add is available as an operand. Floating point operations are particularly vulnerable to this type of stall as they generally take longer to execute. Additionally, a double-precision floating point operation requires a total of up to 128 bits of data (two 64-bit operands). If the size of the data path into or out of the floating point coprocessor is restricted, there will be a delay or stall to allow for additional clock cycles necessary to transfer the data into or out of the floating point unit.

Due to the large variations in the time needed to complete different floating point operations and the impact of stalls caused by data dependency, the operation of the floating point coprocessor plays a major role in determining overall pipeline efficiency.

There is therefore a need for an instruction pipeline which is constructed and controlled so as to minimize instruction latency and minimize or prevent pipeline stalls of any type when performing floating point arithmetic operations, thereby improving overall computer performance.

SUMMARY OF THE INVENTION

The present invention discloses the apparatus and methods necessary to correct the noted operational problems of an instruction pipeline in the specific environment of a Floating Point Coprocessor ("FPC") coupled to a Central Processing Unit ("CPU"). The methods and apparatus include the use of a "Slow/Fast Start" mechanism to read operands into the execution units of the FPC and a mechanism which monitors the pipeline, notes instructions which do not require the use of such resources as the register file and allocates the unneeded resources to other instructions which require their use during the time when the resources would ordinarily be allocated to instructions which did not require them. Although described in the specific environment of a particular RISC FPC, the present invention may be realized in any pipelined computer with a floating point coprocessor.

The present invention is a pipeline controller for a computer system which uses a plurality of different instructions, each instruction being in a different stage of execution. The invention incorporates a pipeline monitoring mechanism which detects the type and stage of execution for each instruction in the pipeline. Coupled to the monitoring mechanism is a conflict detector which determines if two or more instructions will be in the same stage at some future time. A rescheduler means coupled to the detector reschedules those instructions which will be in conflict. Additionally, the pipeline monitoring means controls data transfer from the memory subsystem to the processor by noting the availability of needed data and reading the data at the fastest rate possible.

These optimizations and others are described below in detail with reference to the following figures and drawings:

SPECIFIC DESCRIPTION OF THE PREFERRED EMBODIMENT

The present invention describes several related methods and an apparatus for optimizing the execution of floating point instructions in a "seamlessly coupled" floating point coprocessor ("FPC"), the coprocessor preferably having a 64-bit internal data path and a 32-bit external data path. "Seamlessly coupled" refers to the fact that the coprocessor and the CPU simultaneously interpret a common stream of instructions.

Figure 2:
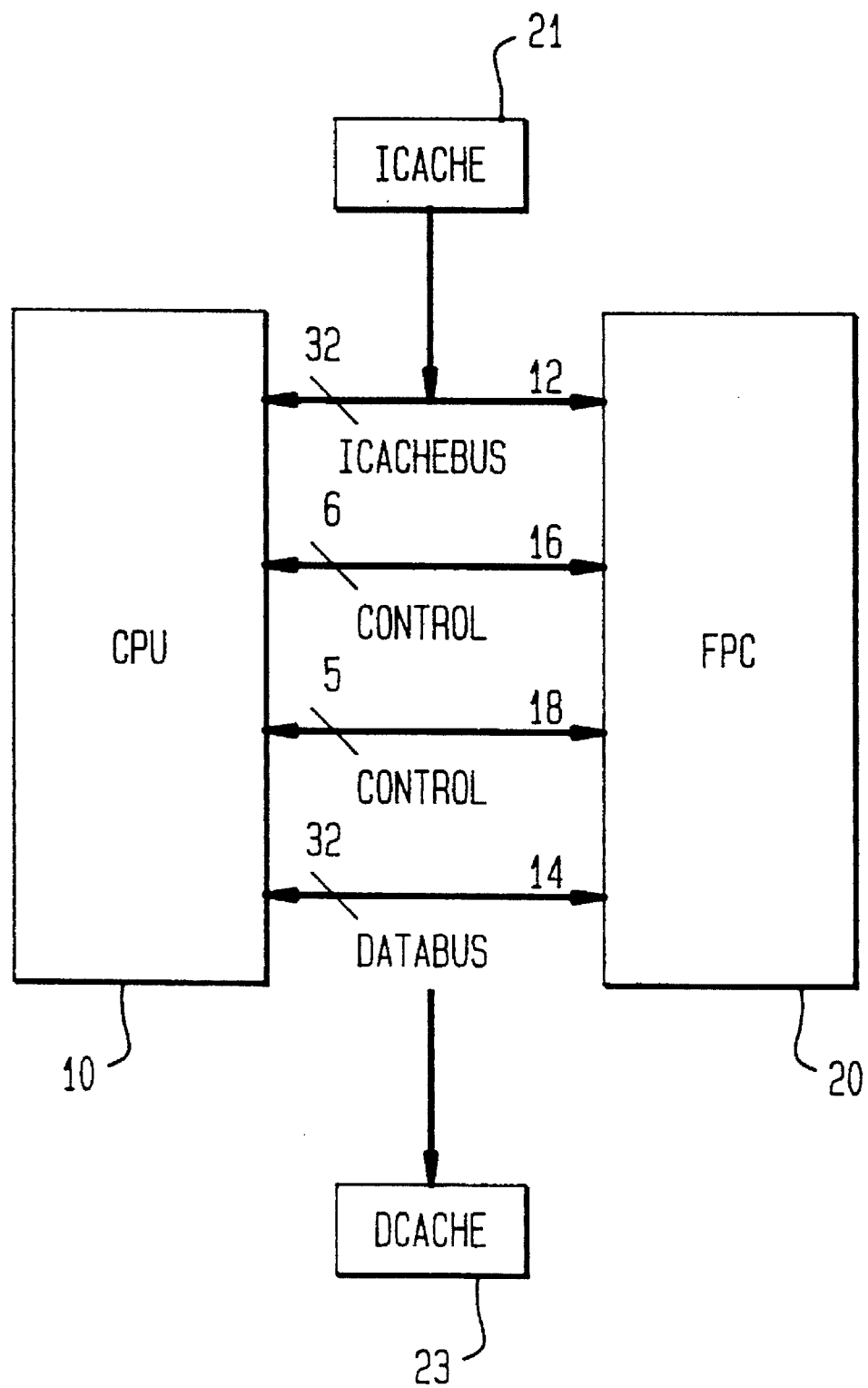
FIG. 2 is a block diagram of the CPU, FPC and their interconnections.

FIG. 2 shows a preferred operating environment of the present invention. CPU 10 and FPC 20 are coupled together by means of Instruction Cache Bus 12, Data Cache Bus 14, and control buses 16 and 18. Instruction Cache Bus 12 is in turn coupled to Instruction Cache 21 and Data Cache 23 is coupled to Data Cache Bus 14. Further detail concerning the cache memories 21 and 23 is set forth in commonly owned U.S. patent application Ser. No. 444,660 filed Dec. 1, 1989 entitled "Two-Level Cache Memory System."

In the preferred embodiment FPC 20 is a Floating-Point Coprocessor, typically implemented in CMOS or ECL semiconductor technology with a reduced instruction set. FPC 20 and CPU 10 both receive 32-bit instructions from Instruction Cache 21 over Instruction Cache Bus 12. The instruction stream is simultaneously monitored by both FPC 20 and CPU 10. FPC 20 only executes those instructions pertaining to floating point operations. These operations are explicitly defined in the architecture for the FPC and can be grouped into five main categories. These are:

Load and Store To/From FPC;

Move To/From FPC;

Move To/From FPC Control Registers;

Computational Instructions; and

Branch on FPC Condition.

FPC 20 and CPU 10 support IEEE Single Precision and Double Precision operations.

Figure 1:
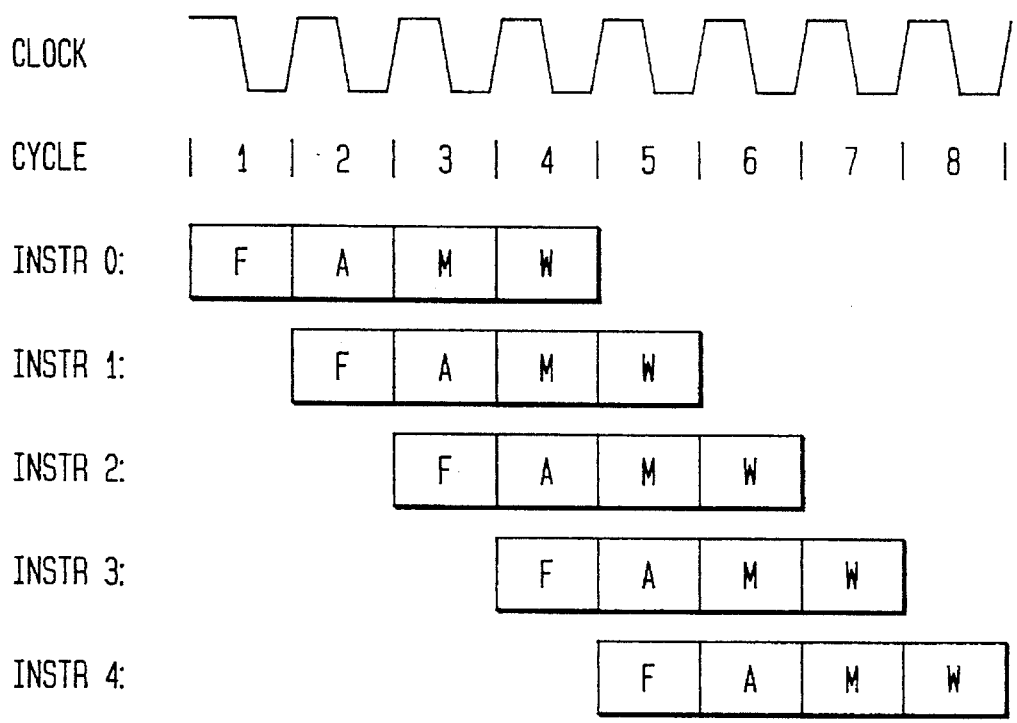
FIG. 1 is a diagram of a basic instruction pipeline.
Figure 3:
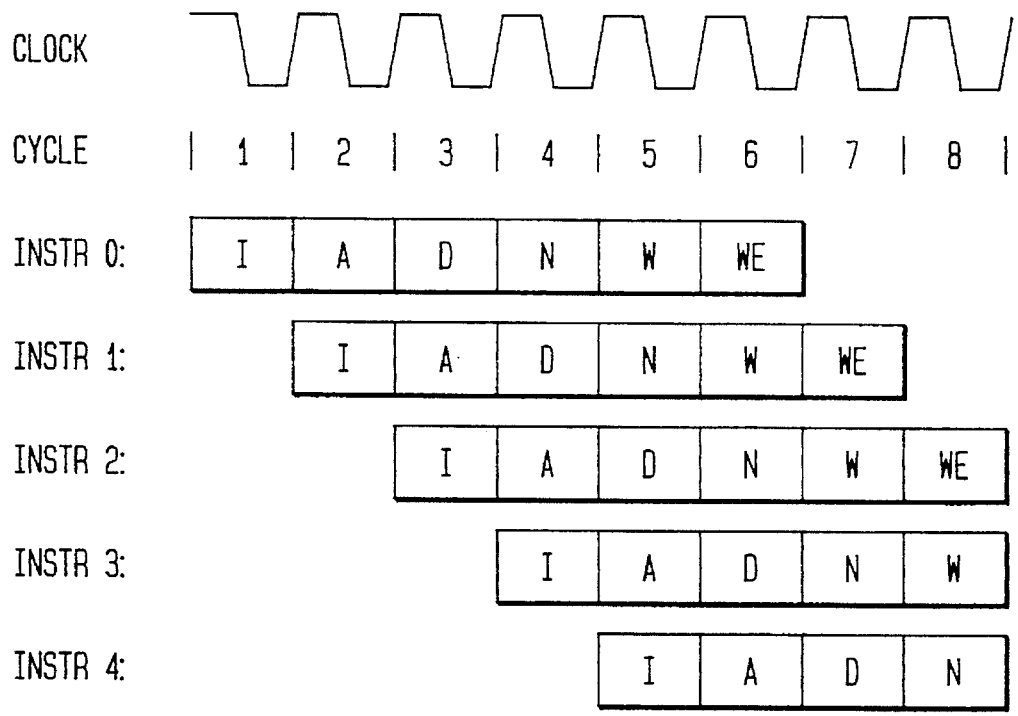
FIG. 3 shows the FPC pipeline used in the present invention.

The FPC pipeline is illustrated in FIG. 3. The pipeline is six stages in depth, with the stages being labeled I, A, D, N, W, and WE. The letters represent the following actions:

I=Instruction Fetch,

A=Read ALU,

D=Cache,

N=Nop/Status,

W=Write/Nop, and

WE=Write Enable.

All six stages are shown for instructions 0, 1 and 2. Normally each instruction stage of the pipeline requires one clock cycle. However, there are cases when a particular instruction stage may require several clock cycles. When this occurs, the condition is called a pipeline stall. An illustration of a pipeline stall is described below in the context of execution by FPC 20 of certain floating point instructions; particularly, the load instructions.

There are two types of load instructions implemented by FPC 20: LWC1 (Load Word Coprocessor 1, shown in FIG. 4) and LDC1 (Load Double Word Coprocessor 1, shown in FIG. 8). LWC1 loads a 32-bit word from the memory subsystem into the FPC general registers. LDC1 loads a 64-bit double word from the memory subsystem into the FPC general registers.

Figure 4:
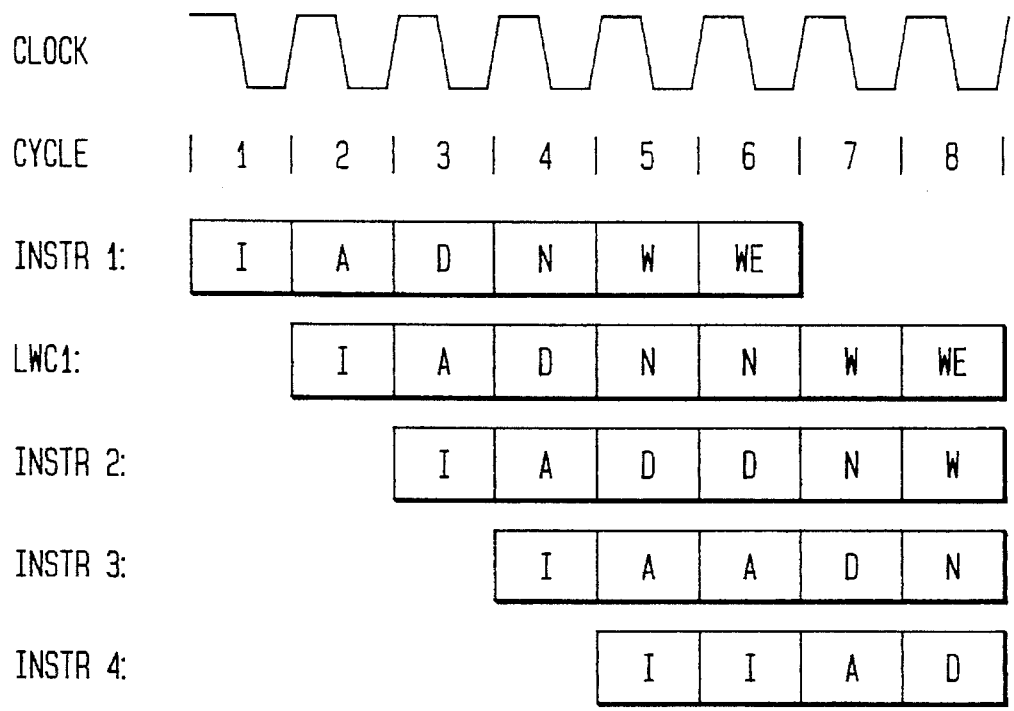
FIG. 4 shows a load stall due to a memory subsystem delay.

Referring to both FIGS. 2 and 4, the address generation for each FPC Load/Store instruction is done by CPU 10. This address is calculated in the A stage of the load instruction. The D stage of the instruction is used by the memory subsystem. In the N stage of the LWC1 instruction the 32-bit load data is placed on Databus 14. Due to the nature of a hierarchical memory system it may take more than one clock cycle for the memory subsystem to return the desired data. When this occurs (as shown in FIG. 4), the N stage of the load instruction will require more than one clock cycle as the data is not yet available. In this case, instructions which are issued after the LWC1 must be "stalled" thereby preventing competition for the N stage resources. This is one example of an N-stage pipeline stall due to data dependency. In the final clock cycle of such an N-stage stall the desired data will be placed on Databus 14. In the W stage of the LWC1 instruction the 32-bit load data is passed to the WE stage. In the WE stage the 32-bit load data is written into the FPC general register file.

LDC1 is similar to LWC1 (See FIG. 8); however, because Databus 14 is only 32 bits wide and LDC1 must load 64 bits, Data Bus 14 must be used twice. LDC1 uses Data Bus 14 twice because the physical packaging of FPC 20 (its number of pins) limits the width of Data Bus 14 to 32 bits. The A and D stages of LDC1 are the same as those for LWC1. In the N stage of LDC1 the first word (32 bits) of the double word that is to be loaded is placed on Databus 14. In the W stage of this instruction the second word is placed on Databus 14.

Finally, the full double word (64 bits) is written into the FPC general register file in the WE stage.

All computational instructions logically read their operands from the FPC general register files and write their results to this same register file. Each computational instruction requires either one or two operands. Additionally, in the present implementation, the hardware supports both 32-bit operations (called Single Precision Operations) and 64-bit operations (called Double Precision Operations). Two operand computational operations will always have equal size operands. FPC 20's general register file is capable of delivering two 64-bit operands each cycle.

Figure 5:
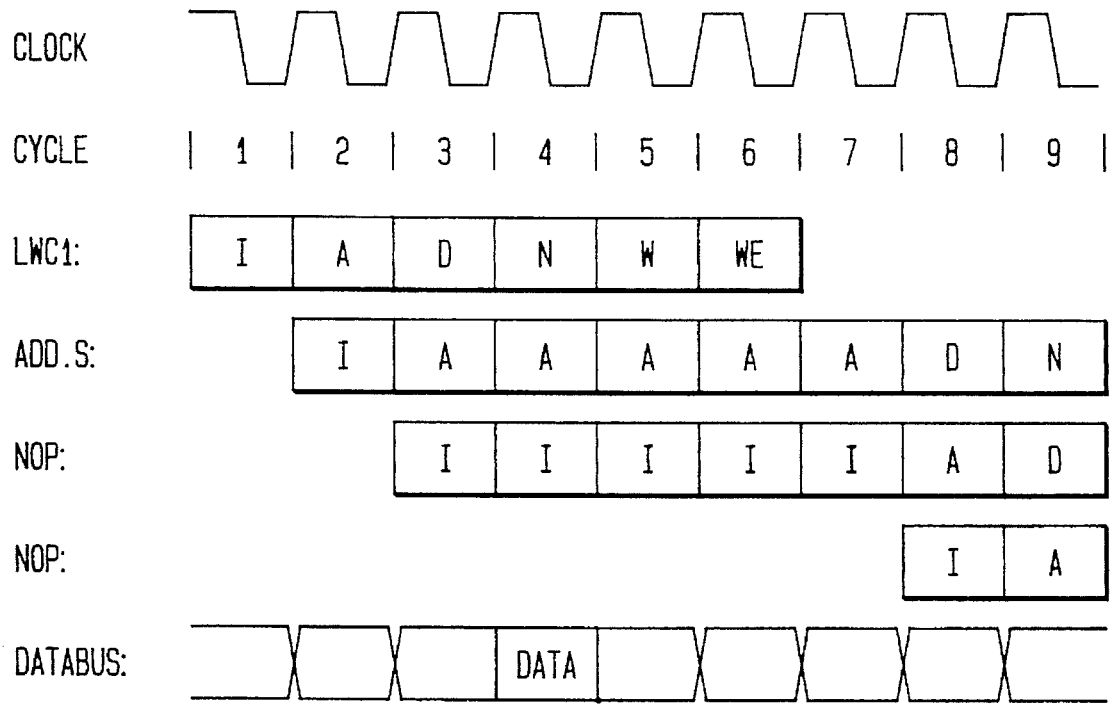
FIG. 5 shows a non-bypassed pipeline stall.

In a pipelined environment interactions can occur between the various instructions in the pipeline such that the various instructions become interdependent. FIG. 5 shows potential inter-instruction dependencies which may occur with single precision operations. As shown, a single precision addition (ADD.S) immediately follows a LWC1. If the destination address of the operand in LWC1 is the same as the source address for one of the operands needed by ADD.S, a pipeline stall occurs. This occurs because ADD.S needs to use the data that is the "result" of LWC1. The LWC1 instruction will not write to the register file with the needed data until the WE stage of LWC1 is reached. However, ADD.S needs to read that data in its A stage. In the illustrated case, ADD.S must wait in its A stage four extra clock cycles until the register write of LWC1 is completed. This results in a pipeline stall of 4 cycles (cycles 3 to 6). The stall degrades system performance as no further instructions can be issued until ADD.S proceeds past its A stage.

Figure 6:
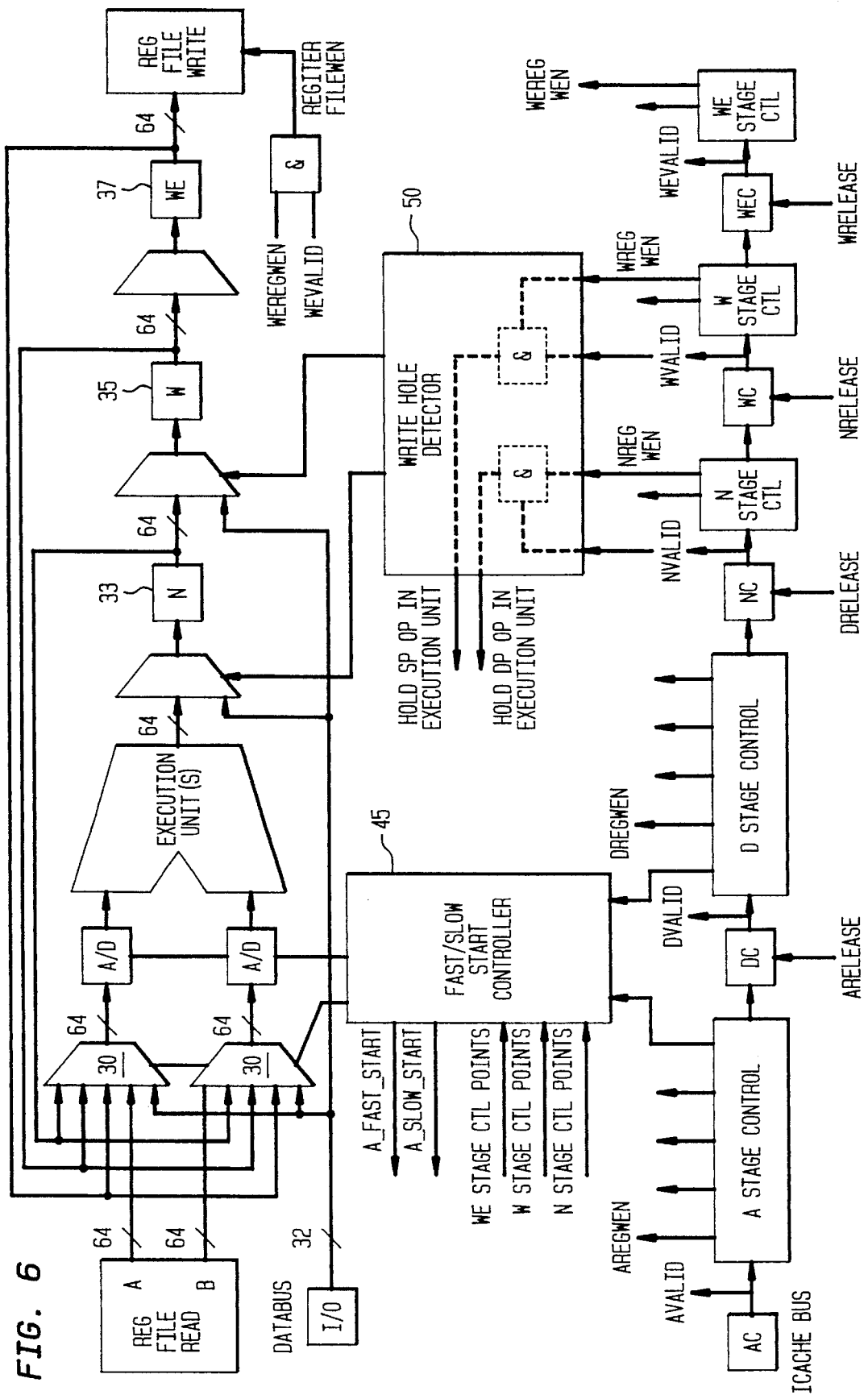
FIG. 6 is a block diagram of the FPC with multiplexer bypasses.
Figure 7:
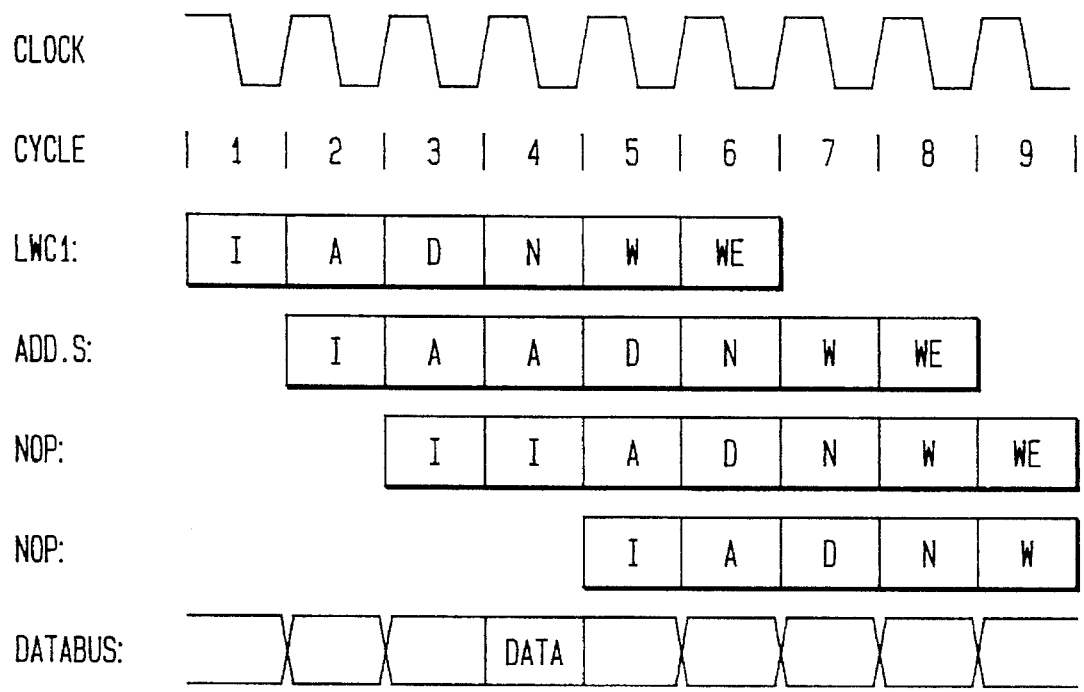
FIG. 7 shows a generic bypassed Single Precision FPC pipeline stall.

A known technique which corrects this type of stall is "bypassing" or "data forwarding". Rather than require that the ADD.S instruction read the operand from the register file, a bypass path is established between the N stage result register and the A stage (actually, in this case, a bypass path is established between Data Bus 14 and the A stage). Consequently, the N stage result of LWC1 can be bypassed to or accessed by the A stage of ADD.S. The mechanism to accomplish this bypass is a set of bypass multiplexers which couple the various stages together. In FIG. 6, FPC 20 incorporates the present invention and is represented in a block diagram. Bypass pathways interconnect N registers 33, W registers 35 and WE registers 37 by means of bypass multiplexers 30. As shown in FIG. 7, the bypassing operation described reduces the length of the pipeline stall from four cycles to one cycle (ADD.S in FIG. 7 spends only two clock cycles in the A stage). All instructions after ADD.S will start three cycles sooner than they would have if no bypass path had been established. In the FPC used in the present invention there are bypass paths from the N, W, and WE stages to the A and D stage.

Double precision instructions require 64-bit operands. If, instead of the previous example, a LDC1 and ADD.D (Add Double Precision) interact, the situation changes. As stated earlier, the single precision ADD.S required 32-bit operands. Thus, when Databus 14 delivered the 32-bit operand in the N stage of the LWC1 instruction, the operand could be bypassed to the A stage of the ADD.S using the multiplexer bypasses shown in FIG. 6 and the execution of ADD.S could continue, maintaining the pipeline's flow.

Figure 8:
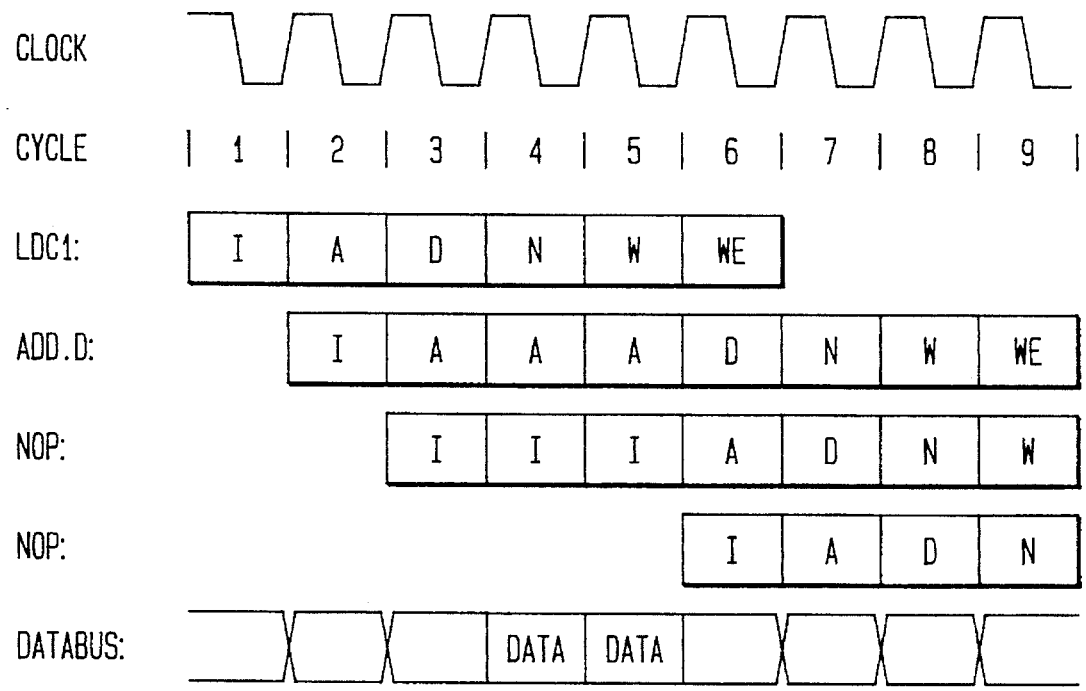
FIG. 8 shows a generic bypassed Double Precision FPC pipeline stall.

However, in the N stage of a LDC1 instruction, the 32 bits of data on the bus are only one-half of the double precision operand. This can be seen by examining the databus timing diagram in FIG. 8. Previous coprocessor designs waited until all 64 bits of the data were received by the FPC before allowing the ADD.D instruction to proceed through the instruction pipeline. FIG. 8 shows this type of stall. In this case, even the presence of bypass paths does not prevent the ADD.D instruction from waiting an additional one cycle in the A stage because the full 64-bit operand is not available until the W stage of the LDC1.

The present invention corrects this problem and improves operational speed by 1 cycle in these cases by allowing the ADD.D instruction to proceed through the pipeline, reading half of its 64-bit operands in the A stage and the remaining half in the D stage, if necessary.

Figure 9:
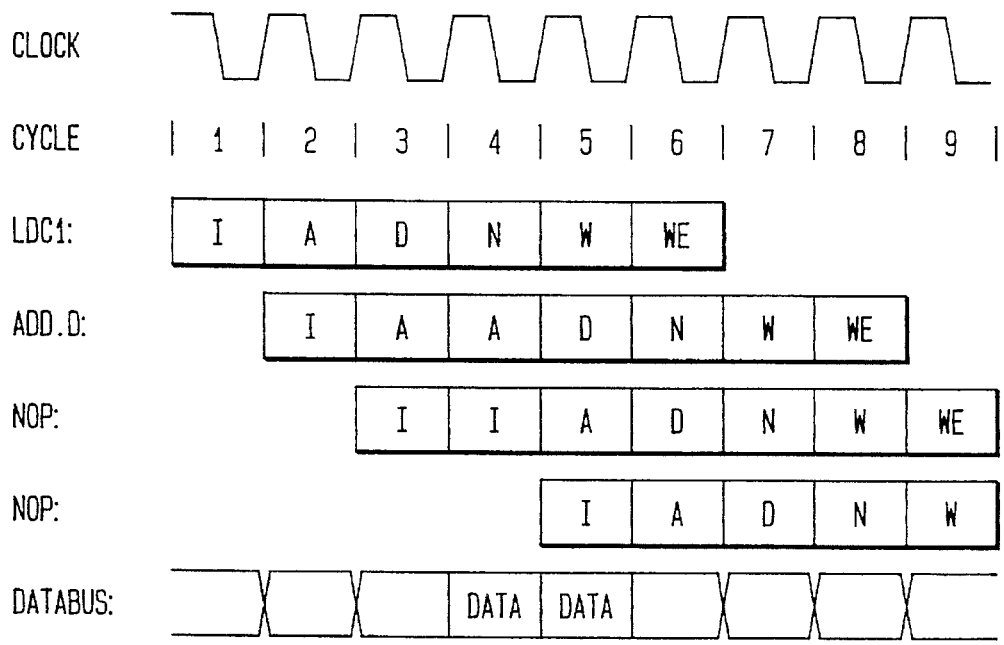
FIG. 9 shows an improved Double Precision FPC bypassed pipeline stall.

The manipulations being described are a consequence of FPC 20 having a 32-bit wide external bus interface but a 64-bit internal data path. Instructions are only released from a given stage when all the resources needed to complete the "work" of that stage are available. The pipeline stall situation just described occurs only when certain instructions which require an external 32-bit wide interface interact with double precision instructions requiring 64-bit operands. When the bypass paths are not needed, all operands are read directly from the A stage register file. In the case shown in FIG. 9, 32 bits of the operands are read using the bypass multiplexers in the A stage and the remaining 32 bits are read in the D stage, also using the bypass multiplexers. This results in two different ways that double precision instructions can proceed through the pipeline. In the case where all operands are available and can be read, they are read in the A stage, and the operation is called a "Fast Start". All instructions using single precision operands are "Fast Start" operations. In the case where the first half of the 64-bit operand may be bypassed in the A stage, 32 bits of the operand are read in the A stage and 32 bits in the D stage and the procedure is called a "Slow Start". The mechanism to implement this method is shown as "Fast/Slow" start controller 45 in FIG. 6. This alternative method and apparatus maximizes the instruction issue rate by permitting a "Fast Start" when all operands are available in the A stage, and by ordering a "Slow Start" if instruction interaction prevents a "Fast Start".

Fast/Slow Start controller 45 does not begin operation until it receives both a Valid and Release signal from the A Stage Control. The execution of instructions in the pipeline is controlled by pipeline stage Valid and Release signals. Each of the pipeline stages, herein A, D, N, W and WE, have an associated Valid and Release signal. The Valid signal indicates that a valid instruction occupies the stage of the pipeline transmitting the signal. If a stage's Valid signal is not active in a given cycle, then this stage in the pipeline is considered empty or void and another instruction is allowed to proceed into that stage. When the Release signal is activated this indicates that the instruction in the particular stage is valid, has completed the stage, and will proceed to the next stage. The Release signal embodies the pipeline's contention information and, when active, indicates that the successive stage is available.

The initial assumption of Controller 45 is that all operations start fast. If a double precision operand is required, Controller 45 first looks to see if all 64 bits are already available in the register file or if all 64 bits are obtainable from the bypass multiplexers 30. If all 64 bits are not immediately available, the Controller 45 checks the bypass multiplexers 30 to see if the first half of the 64-bit operand(s) can be obtained therefrom. If so, a slow start is commanded. Otherwise a pipeline stall will occur in the A stage until the first half of the 64-bit operand is available.

Instructions are not allowed to proceed from one pipeline stage to the next until the work of the present stage is completed. Part of the "work" performed in the A stage is to determine if the operands needed by the instruction in the A stage are available. If they are available, then the bypass multiplexers must select them from the proper source, either one of the bypass paths or the register file. The A stage Release signal is not allowed to become active until the operands are available. Instructions stall in the A stage until the operands are available.

Sets of Bypass equations and Interlock equations implemented in hardware cooperate to insure that these constraints are met. The Interlock equations determine if the operands are available, without regard as to whether they are in the register file or in the bypass multiplexers. The A stage Release signal will not be active if the A stage interlock signal is active. The Bypass equations control the bypass multiplexers and cause them to select the proper source from which to obtain the operands, without regard as to whether or not the operands are available. The implementation of the equations causes the Bypass equation to select the correct operand when the A stage Release signal is active.

The Interlock equations insure that when an instruction "Releases" from the A stage, the bypass multiplexers are able to select the correct operands. The only reason that the operands would not be in the Register File and available immediately is that, if the current instruction is trying to use the result of a previously issued instruction, the issued instruction's results might not have been written into the Register file yet and the results might not be in a stage in the pipeline from whence the result can be bypassed. The method used to detect this condition is described below.

Part of the control word that propagates through the instruction pipeline is the Register File Write Address. This address specifies the register number to which the results of the instruction should be written. Part of the instruction encoding specifies this address. This encoding occurs while the control word is being formed in the A stage and propagates through the instruction pipeline. When an instruction is in the A stage, the Interlock equations use hardware comparators to compare the Register File Read Address(es) (the register address(es) from which operands are to be obtained) to the Write Addresses of instructions that have 1) previously issued, 2) not yet written their results to the Register file and, 3) not yet reached a point in the pipeline from which the result can be bypassed. If a match is detected, the Interlock equation will become active and remain active until the results of the previously issued instructions reach a point in the pipeline where the results can be obtained using the bypass multiplexers. In short, the Interlock equations work by comparing the Read Address(es) for operands used in the A stage instruction to the Write Addresses used by the previous instructions.

The Bypass equations work in a similar manner to the Interlock equations except that the Bypass equations compare the Read Address(es) of the A stage instruction to the Write addresses of instructions that have 1) previously issued, 2) not yet written their results to the Register File, and 3) have reached a point in the pipeline where results can be bypassed. If no match is found, then the Bypass equations set up the bypass multiplexers to default to the Register file. If a match is found then the Bypass equations set up the bypass multiplexers to select the most recently generated results.

The techniques used and described with both the Interlock and Bypass equations are known in the art. To accomplish the Fast/Slow start mechanism of the present invention, the standard Interlock and Bypass equations are changed. The standard Interlock equation will signal an interlock if the complete operands are not available in the A stage. In the present invention, an interlock should only be generated if the first half of the operand is not available. In the MIPS RISC architecture double precision data is stored in an Odd/Even Register pair. The floating point register file comprises 32 32-bit wide registers. The odd numbered registers hold the most significant word (the first word) of a double precision operand and the Even numbered registers hold the least significant word (second word) of a double precision operand. The Even register holds single precision operands. It is a violation of the architecture to have a single precision operand stored in an Odd numbered register.

The modification to the Interlock equations is partially achieved by modifying the address comparators. When a double precision instruction is in the A stage the Interlock address comparators look for matches, using the previously described three rules, to the Odd register numbers only. If no match is found then the A stage instruction is allowed to release from the A stage without regard to the Even numbered register address comparison operations.

The A stage even numbered register address compare is used by the Fast/Slow start controller to make the determination of whether the double precision instruction will start Fast or Slow. If no match is found then this indicates that the second word of the double precision operand is available in the A stage and the instruction will start Fast. If a match is found then the instruction starts Slow, reading only the first word of the double precision operand in the A stage. A new set of D stage Interlock equations is implemented that function in a manner similar to the A stage Interlock equations except that matches in the Even numbered registers of the D stage are determined. These equations are used only for instructions which start Slow. If a match is found then the interlock equations will stall the instruction that was started "Slow" in the D stage until the second word of the double precision operand becomes available.

Single precision instructions use only the A stage even numbered register address comparisons. If a match is found the single precision instruction will stall in the A stage until the operand becomes available. As single precision instructions only read 32-bit operands the Fast/Slow start controller will always indicate a Fast start for these instructions.

Similar changes are made to the Bypass equations. First, the bypass multiplexers are separated into two independent sets of multiplexers. One set serves the Odd data path (the first word of the double precision operand) and the other set serves the Even data path, which is either the second word of the double precision operand or the single word of a single precision operand. The address comparators for the Odd bypass equations are coupled to the Odd numbered registers. The address comparators for the Even bypass equations are coupled to the Even numbered registers. The Bypass equations for the even side of the data path are modified to work in the A stage in order to accommodate a Fast start and in the D stage to accommodate a Slow start. This modification is accomplished by merging the A stage operand Read address into the control word that is sent to the D stage. This address is compared against the write addresses of other control words in the previously described manner.

The Fast/Slow controller monitors the state of the modified Interlock equations in the A stage and develops two control points, A_Fast_Start and A_Slow_Start. These control points are merged into the previously mentioned control word and sent down the instruction pipe to be used in a myriad of other control equations along the way.

The use of "Fast Start"/"Slow Start" to optimize pipeline operations has its own impact upon the pipeline. For example, the ADD.D will require a set number of cycles from the time that the operands are received until the result is ready. In the present implementation, this is two clock cycles. Therefore, if all 64 bits of both operands are received in the A stage, the ADD.D result will become available in the W stage of the ADD.D (i.e. the result can be bypassed to some later instruction from the W stage using the bypass multiplexers if necessary). However, if only 32 bits of an operand are available in the A stage and ADD.D is nevertheless allowed to proceed to the D stage where the remaining 32 bits are obtained, the result of ADD.D will not be available until the WE stage.

We have chosen in the preferred embodiment to have double precision operations read all 64 bits if possible in the A stage, but to read 32 bits in the A stage when 64-bit reads are not possible. The remaining 32 bits are read in the D stage if necessary. This offers significant performance improvements over forcing all double precision operations to wait and read 64 bits in the A stage, or forcing a 32-bit read in the A stage followed by a 32-bit read in the D stage. Thus the present invention provides the hardware necessary both to start double precision computational instructions as soon as possible, as has been described, and to allow them to finish as soon as possible, which will now be described.

As stated, one goal of a RISC architecture is that instructions execute at an average rate close to one per cycle. Such an architecture can most readily take advantage of an instruction pipeline. As all instructions logically execute in a single cycle, the instruction pipeline can have a constant length. As shown in FIG. 3, the present invention uses a six stage instruction pipeline. To prevent resource competition, all instructions must be completed "within" the six pipeline stages.

Floating point operations are inherently more complex than the simplest instructions used in a RISC architecture. In many designs, even a simple floating point add requires more than one clock cycle to complete. Floating point multiplications can require three to four clock cycles, and floating point divides may require as many as forty to sixty cycles to complete.

Figure 10:
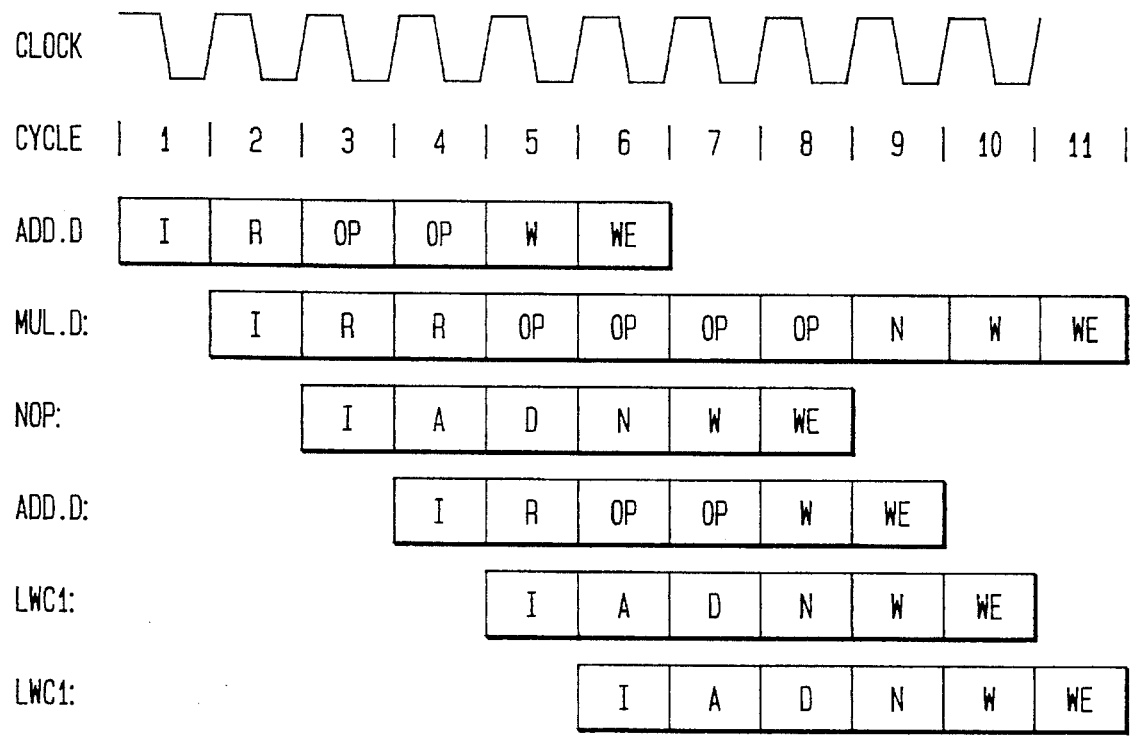
FIG. 10 illustrates the pipeline state which must be avoided when instructions with variable latency are executed.

FIG. 10 illustrates an instruction pipeline when several floating point instructions are being performed. For the sake of clarity, the floating point operations (ADD.D and MUL.D) use different mnemonic letters to label the pipeline stages than such operations as LWC1. These different mnemonic letters are I for Instruction Fetch, R for Operand Read, and OP for Operational Latency. FIG. 10 illustrates the fundamental difficulty in trying to execute instructions in a pipeline when the instructions have variable operational latency. As long as the latency of each instruction is the same, each instruction can have reserved for it the resources it requires. For example, each instruction has one cycle in which it can write its result to the register file (the WE stage). As long as each instruction has the same latency, at any given time there will only be one instruction in the WE stage and it can write to the register file. In the example shown in FIG. 10, however, the MUL.D instruction has a longer latency than can fit in a six stage pipeline. It therefore does not write to the register file in cycle 7, but attempts to write to the register file in cycle 11. This causes a conflict because the LWC1 is "scheduled" to write to the register file in cycle 11. In some computers, this problem has been solved by providing the register file with two write ports, enabling two instructions to write to the register file simultaneously.

The present invention provides a unique method and apparatus which avoids the need for either a dual write ported register file or an additional buffer register. It is known that not all instructions which use the pipeline need to write to the register file. For example, store instructions, floating point compare instructions, and any instructions which are actually executed by CPU 10 do not write to the floating point register file. This means that frequently the WE stage will not involve any writing to the register file.

Figure 11:
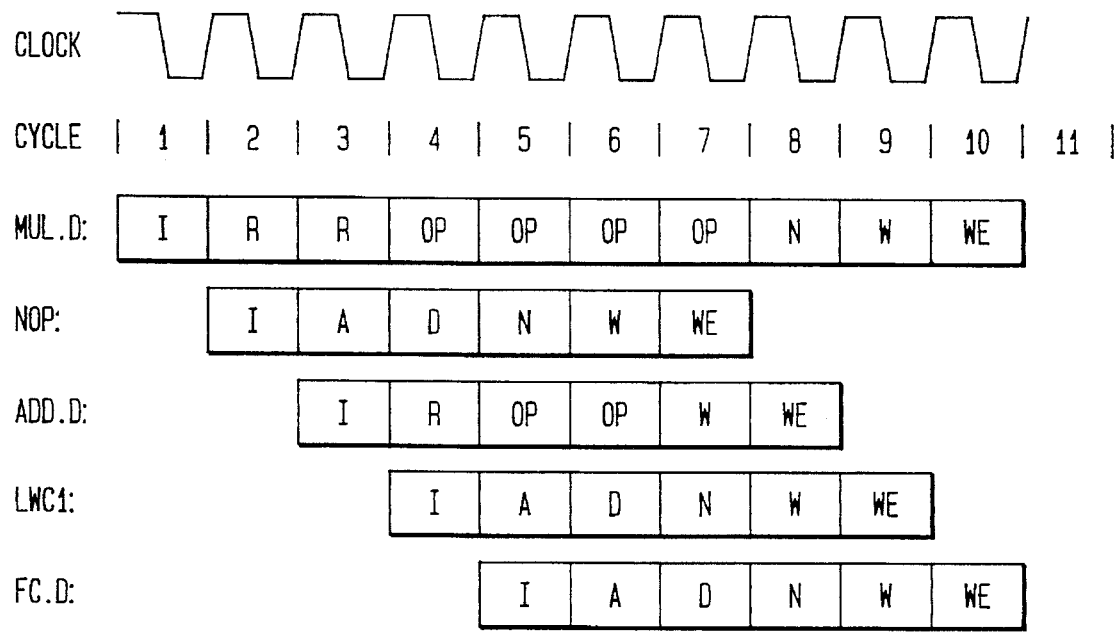
FIG. 11 shows a pipeline with a serendipitous "Write Hole"

Our system monitors the pipeline and keeps a running calculation or tally of which instructions will need to write to the register file and during which cycle they will need to write there. The "Write Hole" Detector 50 in FIG. 6 notes in cycle 8 that both the MUL.D instruction and the FC.D instruction are "scheduled" to write to the register file in cycle 10 (See FIG. 11). The mechanism also knows that FC.D does not use the register file and thus sees a "Write Hole" open in the pipeline. A "Write Hole" is defined as an instruction passing through the pipeline's WE stage that does not need to write to the register file. "Write Hole" detector 50 monitors the execution of all instructions which have varied operational latencies. Whenever a given instruction with a variable latency such as depicted in FIG. 11 is about to proceed to the N stage, detector 50 checks to see if any other instruction is also about to move to the N stage. If another instruction is ready to move into the N stage, the control circuitry checks to see what type of instruction it is. If it is the type of instruction which does not write to the register file, the circuitry allows the given instruction to proceed to the N stage.

Figure 12:
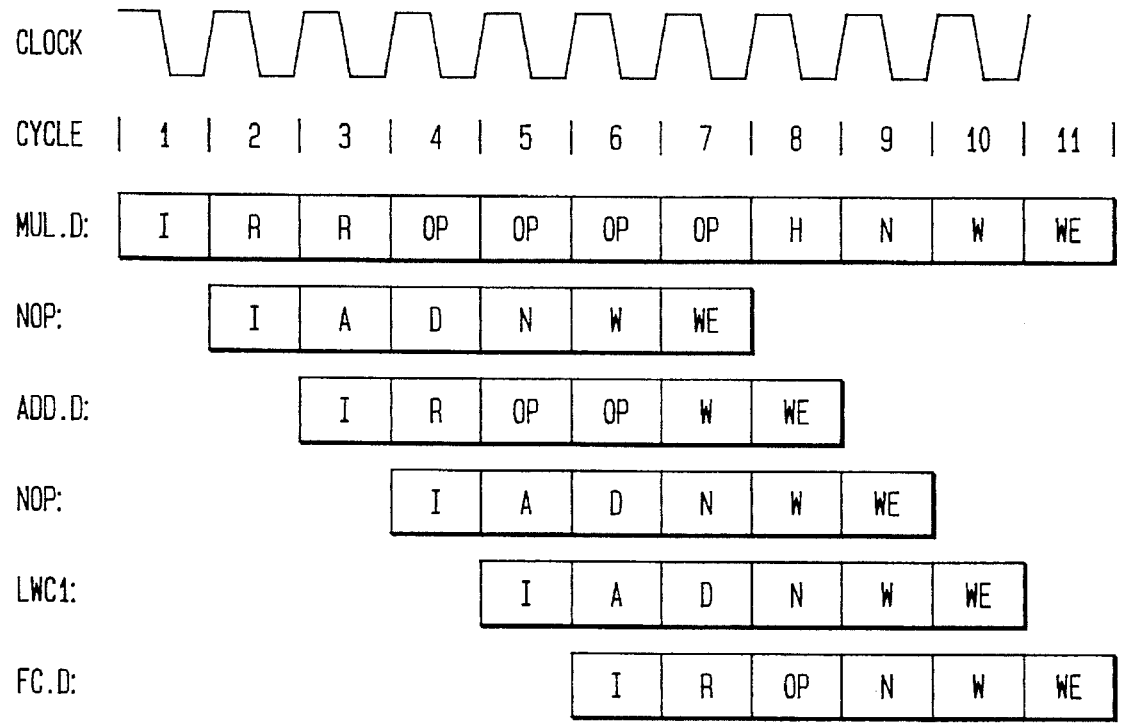
FIG. 12 shows how the present invention waits for a "Write Hole".

FIG. 12 shows how the "Write Hole" detector reschedules instructions when necessary to avoid stalls and resolve potential resource conflicts. During cycle 8, the detector notes that MUL.D and LWC1 are scheduled to enter the WE stage in cycle 10 simultaneously. As LWC1 uses the register file, detector 50 inserts a hold cycle ("H") into MUL.D prior to its N stage. This reschedules MUL.D's WE stage to cycle 11, correcting the potential resource conflict without stalling in the LWC 1 instruction. As the next instruction after LWC1 is an FC.D, detector 50 sees the "Write Hole" (FC.D does not use the register file) and allows MUL.D to proceed, having only inserted one H stage. Thus, the detector accommodates variable latency instruction without requiring a dual write ported register file or extra buffer registers. It also speeds the completion of instructions to a maximum and reduces stall cycles.

The mechanism whereby Write Hole Detector fulfills its purpose will now be explained. The execution of instructions in the pipeline is controlled by pipeline stage Valid and Release signals. Each of the pipeline stages, herein A, D, N, W and WE, have an associated Valid and Release signal. The Valid signal indicates that a valid instruction occupies the stage of the pipeline transmitting the signal. If a stage's Valid signal is not active in a given cycle, then this stage in the pipeline is considered empty or void and another instruction is allowed to proceed into that stage. Such a "void" stage is known in the art as a "bubble" in the pipeline. When the Release signal is activated this indicates that the instruction in the particular stage is valid, has completed the stage, and will proceed to the next stage. The Release signal embodies the pipeline's contention information and, when active, indicates that the successive stage is available. These Valid and Release signals create a pipeline environment wherein any instruction can stall in any stage, but those instructions which have proceeded past the stalled stage can still be completed.

The Valid signals are ultimately used to enable an instruction to alter the state of the machine. For example, during store instructions, a Valid signal from the A stage informs the cache system to begin a storage operation. For any of the computational instructions, a Valid signal from the WE stage enables the register file write pulse.

The register file write enable is a good example of how valid signals are used. During the A stage of an instruction which will write to the register file (either a computational or load instruction), a register write decode signal is activated. This signal is staged along with the write address and write data through the pipeline, successively using the Valid and Release signals for the D, N, and WE stages. Finally, when the WE stage transmits both a Valid and Release signal and the WE write decode signal is on, the register write pulse is allowed to clock the register file, thereby "writing" to the register.

When there is no resource contention within the pipeline, each stage takes one clock cycle and instructions are completed at the rate of one per clock cycle. As discussed previously, several conditions can cause pipeline stalls or interlocks. These conditions cause the Valid signal from the stalled stage to remain active and the register for that stage to "stick". Each stage of the pipeline described herein has a related "stall" equation. For example, each valid stage is interlocked by the following stage so that if a stall occurs at the end of the pipeline, all preceding stages are stalled. This prevents the very destructive situation of instructions overwriting an active stage. This interlock mechanism is "interrupted" by an invalid pipeline stage. For example, if the W stage is stalled and the N and D stages are not valid, the instruction in the A stage will be allowed to propagate up to the N stage. This presupposes the absence of other A stage interlocks. On the other hand, if an early stage is stalled, successive stages have no reason to stall and the instructions therein proceed to completion.

Each instruction going through the pipeline has a related control word. A bit in the control word indicates whether the instruction will write to the register file. Write Hole Detector 50 is coupled to the N stage control registers 52 and 53 and W stage control register 55 and 57. As instructions enter the N stage, Write Hole Detector 50 checks to see if the N stage register is signalling Valid and if the N stage Write Enable signal is also valid. If both signals are valid, if there is a double precision computational instruction being executed in execution unit 40, and if the instruction has finished its operational latency, Write Hole Detector 50 signals execution unit 40 to hold the instruction. In the case of single precision instructions, Write Hole Detector 50 monitors the same signals at the W stage controllers and issues the same hold signal to execution unit 40 if the signals are both on. This process prevents those arithmetic computations which might be in progress in the execution unit from moving into the N stage (W stage for single precision instructions) at a time when this might result in contention for the register file. In addition, it allows subsequent instructions to continue to make progress while the instructions in execution unit 40 waits for a "Write Hole" in which to return its result. Of course, if one of the subsequent instructions requires the result of the instruction in execution unit 40, the controller will stall that instruction so that the execution unit 40 can return the required result. The detector circuitry which comprises Write Hole Detector 50 is the N and W stage controllers and two AND gates within the detector.

In the foregoing specification, the invention has been described with reference to a specific exemplary embodiment thereof. It will, however, be evident that various modifications and changes may be made thereunto without departing from the broader spirit and scope of the invention as set forth in the appended claims. For example, the "Slow Start/Fast Start" feature would be useful in any computer system wherein the instruction execution unit has a larger internal bus width than the external data paths coupling the execution unit to the memory subsystem. Also, any pipelined computer, whether or not it is based on RISC design principles, could utilize the concept behind the "Write Hole" detector to allocate computer resources among instructions of varying latency. The changes and modifications necessary to accommodate the present invention in other known systems are readily envisioned. The specification and drawings are, accordingly, to be regarded in an illustrative rather than restrictive sense.

What is claimed:

1. A pipeline controller for a computer system having an instruction pipeline containing a plurality of types of multiple stage issued instructions, having variable execution latencies, and requiring particular computer resources at different stages of execution, the controller comprising:

pipeline monitoring means coupled to the instruction pipeline for detecting the types and stages of execution of issued instructions in the pipeline;

conflict detector means coupled to the pipeline monitoring means for detecting when two issued instructions in the pipeline will require a given computer resource in a same stage at some future time; and rescheduler means coupled to both the conflict detector means and to the instruction pipeline for rescheduling one of said two issued instructions which will be in the same stage at some future time, said rescheduler means including means for detecting when a third issued instruction will not require said given computer resource in said same stage at some other future time, and means for enabling the rescheduled one of said two issued instructions and said third issued instruction to continue execution such that the rescheduled one of said two issued instructions has exclusive access to said computer resource at said other future time when both said third issued instruction and the rescheduled one of said two issued instructions are in the same stage of execution in the instruction pipeline.

2. The pipeline controller of claim 1 wherein the rescheduler means inserts 'Hold' stages into those instructions which will be in conflict with other instructions.

3. The invention of claim 1 wherein said computer system provides computer resources required by said instructions; and wherein said conflict detector means includes means for determining whether said at least two instructions will require a same resource when in the same stage.

4. The invention of claim 3 wherein said same resource comprises a register file to which a write operation will be required by at least one of said instructions.

5. A method for controlling execution of issued instructions in a computer, having an instruction pipeline for receiving a plurality of multi-stage instructions, having variable execution latencies, and a plurality of computer resources, the method comprising the steps of;

(a) monitoring each issued instruction in the instruction pipeline;

(b) determining what computer resources are needed for each issued instruction and the stages at which the needed resources will be required by each instruction;

(c) detecting when two different issued instructions will require one identical resource at a same time;

(d) rescheduling one of the two issued instructions so that the identical resource will no longer be required at the same time by the two issued instructions;

(e) detecting when a third issued instruction will not require said identical resource during a given stage of said third issued instruction; and (f) enabling the rescheduled one of said two issued instructions and said third issued instruction to continue execution such that the rescheduled one of said two issued instructions has exclusive access to said computer resource at said other future time when both said third issued instruction and the rescheduled one of said two issued instructions are in the same stage of execution in the instruction pipeline.

6. The method of claim 5 wherein the step of rescheduling comprises maintaining one of said instructions in a "HOLD" state until the two different instructions will not require the identical resource at the same time.

7. The method of claim 5 wherein said one identical resource is a register file to which a write operation will be required by at least one of said instructions; and wherein said step of detecting includes the step of determining whether both of said two different instructions will require a write operation to said register file at the same time.

8. A method for optimizing the operation of a multi-stage instruction pipeline for receiving multi-stage instructions in a computer having a processor with an internal data path and a memory bus, the instructions in the pipeline requiring different amounts of data, the processor data path having a first data width, and the memory bus having a second, smaller data width, the method comprising the steps of:

monitoring the instructions in the pipeline and the processor;

monitoring the amount of data required by each instruction;

detecting whether the amount of data required by a given instruction can be accommodated by the memory bus in a preset amount of time;

ordering the processor to read the data in successive stages of said pipeline over a total time equal to a multiple of the preset amount of time if the memory bus cannot accommodate all of the data required by a given instruction in said preset amount of time, and permitting said given instruction to proceed to a next stage in the instruction pipeline after the first read operation; and allowing a new instruction to enter said pipeline in the stage from which said given instruction proceeded.

9. The method of claim 8 wherein the processor can use a maximum of 64 bits of data in the preset amount of time and the memory bus can supply a maximum of 32 bits of data in the preset amount of time.

10. The method of claim 8 wherein the preset amount of time is one machine cycle.

11. For use in a computer having a processing means, a multi-stage instruction pipeline coupled to the processing means for supplying multi-stage instructions thereto, a memory means for storing data, and a memory bus means for enabling transfer of data between the processing means and said memory means, said processing means having an internal data bus of first data width, said memory bus means having a data width less than said first data width; a controller means for controlling the transfer of data from the memory means to the processing means and for controlling the flow of instructions through the instruction pipeline, said controller means including means for determining the amount of data required by a given instruction, means for determining whether the amount of data required by the given instruction exceeds the data width of said memory bus, means for enabling a sequential read of the amount of data required by the given instruction during successive stages of the given instruction's execution in the pipeline, means for permitting the given instruction to proceed to a next stage in the instruction pipeline prior to the completion of the sequential read of the amount of data; and means for allowing a new instruction to enter said pipeline in the stage from which said given instruction proceeded.

12. The controller of claim 11 wherein the internal data bus is 64 bits wide and the memory bus is 32 bits wide.

13. A method of varying a progression of instructions through an instruction pipeline having a plurality of stages in a data processing system having a flow path having a plurality of stages, a register file, an input data bus and a plurality of bypass multiplexers interconnecting predetermined data stages in the data flow path and having a known processing cycle, said instructions including a first instruction type requiring operands having a first data width and a second instruction type requiring operands having a second data width wider than said first data width, said method comprising the steps of:

A. introducing a first instruction into a given stage in the instruction pipeline;

B. determining the type of instruction;

C. for an instruction of the first type, proceeding by:
(I) making at least one operand required by the instruction of the first type available;
(II) determining whether each operand required by the instruction of the first type is available from said register file or from a subsequent stage of the pipeline via one of said plurality of bypass multiplexers;
(a) if so, reading each operand required and permitting the instruction to proceed to a next stage in the instruction pipeline for further processing;
(b) if not, holding the instruction in the given stage for at least one processing cycle and repeating steps (I) and (II);

D. for an instruction of the second type, proceeding by:
(III) making at least part of each operand required by the instruction of the second type available, each operand required by the second type of instruction having a first and a second half;
(IV) determining whether the first and second halves of each operand are available from said register file or from a subsequent stage of the pipeline via one of said plurality of bypass multiplexers;
(c) if so, reading each operand required and permitting the instruction to proceed to the next stage in the instruction pipeline for further processing;
(d) if not, determining whether the first half of each operand required is available from said register file or from a subsequent stage of the pipeline via one of said plurality of bypass multiplexers:
(i) if so, reading the first half of each operand required and permitting the instruction to proceed to the next stage in the instruction pipeline and proceeding to step (aa);
(ii) if not, holding the instruction in the given stage for at least one processing cycle and repeating step (d);
(aa) determining whether the second half of each operand required is available from said register file or from a subsequent stage of the pipeline via one of said plurality of bypass multiplexers;
(x) if so, reading the second half of each operand required and permitting further processing of the instruction;
(y) if not, holding the instruction in the next stage for at least one processing cycle and repeating step (aa).

14. The method of claim 13 wherein said first type of instruction is a single precision instruction and said second type of instruction is a double precision instruction.

15. The invention of claim 13 wherein said first instruction includes a source address for each operand required by said first instruction; wherein the instruction pipeline contains at least one other instruction introduced thereinto before said first instruction, said other instruction including a destination address for data resulting from a processing of said other instruction; and wherein at least one of said steps of determining includes the step of comparing said source address with the destination address to determine availability of each operand required by said first instruction.

16. A method for controlling execution of issued instructions, having variable execution latencies, in a data processing system having an instruction pipeline with a plurality of stages for temporarily holding issued instructions identifying data processing operations, said data processing system having at least one data processing element to which access is required by at least two of said issued instructions, said method comprising the steps of:

(a) monitoring the issued instructions in various stages in the pipeline;

(b) determining whether two issued instructions in the pipeline will require contemporaneous access to an identical data processing element when each issued instruction is in an identical later stage in the instruction pipeline;

(c) temporarily holding one of said two issued instructions in a current stage in the instruction pipeline in response to the determining step (b);

(d) detecting another issued instruction which will not require contemporaneous access to said identical data processing element when in said identical later stage in the instruction pipeline; and (e) permitting the held instruction and said other issued instruction to continue execution such that the held issued instruction has exclusive access to said computer resource at said other future time when both the held issued instruction and said other issued instruction are in the same stage of execution in the instruction pipeline to proceed to a next stage in the pipeline in response to the detecting step (d).

17. The invention of claim 16 wherein said data processing element is a register file; and wherein said step (b) of determining includes the step of determining that said two instructions will require access to the register file during the identical later stage to write information resulting from processing each instruction.

18. The invention of claim 16 wherein said step (c) of temporarily holding is performed on that one of said two instructions introduced into the instruction pipeline before the other one of said two instructions.

19. The invention of claim 16 wherein at least some of the said instructions have different operational latencies.

* * * * *